Oct. 2, 1934.　　　J. S. PARSONS　　　1,975,172
PROTECTIVE SYSTEM
Filed July 29, 1932　　2 Sheets-Sheet 1

WITNESSES:　　　　　　　　　INVENTOR
　　　　　　　　　　　　　John S. Parsons.
　　　　　　　　　　　　　BY
　　　　　　　　　　　　　　ATTORNEY Patented Oct. 2, 1934

1,975,172

UNITED STATES PATENT OFFICE 1,975,172

PROTECTIVE SYSTEM

John S. Parsons, Swissvale, Pa., assignor to Westinghouse Electric & Manufacturing Company, East Pittsburgh, Pa., a corporation of Pennsylvania Application July 29, 1932, Serial No. 626,034

5 Claims. (Cl. 175—294)

My invention relates to distribution systems and particularly to such systems in which power, transmitted by means of alternating-current feeders, is supplied through transformers to one or more alternating-current distribution networks and also through suitable conversion apparatus to one or more low voltage direct-current distribution networks.

In such systems, because of the large amounts of power transmitted, the losses in the power apparatus represent an economic factor which must be balanced against other economic factors such as the initial cost of the system and the cost of maintenance in arriving at a commercially feasible system. Although there are many forms of apparatus available for converting alternating-current to direct-current, because of the economic considerations mentioned above, the choice usually lies between rotary converters and rectifiers, usually of the mercury arc type.

Of these two forms of apparatus, the rotary converter is that most commonly used and its field of application covers a range of direct-current voltages from 250 volts to 1200 volts upward. Mercury-arc rectifiers are extensively used to obtain direct-current voltages ranging from 350 volts to 4700 volts and find their greatest field of application in the railway art.

The protective apparatus commonly used with rotary converters differs from that used with mercury-arc rectifiers because of individual peculiarities of the two forms of apparatus. The rotary converter transmits power freely in either direction, depending upon its excitation and the relationship of voltages on its alternating-current and direct-current sides. It may reach high speeds operating as a direct-current motor with reduced excitation, and as it is a synchronous machine, it may drop out of synchronism upon a reduction of alternating-current voltage. Because of these characteristics, the proper protection of a converter requires circuit breakers on both sides, overload, reverse power and undervoltage relays and an over-speed device.

The mercury arc rectifier normally transmits power in only one direction. It is very efficient at high voltages but is usually less efficient than the synchronous converter at voltages below 350 (direct current output). The principal difficulty encountered in the operation of mercury-arc rectifiers is their tendency to "back-fire", that is, because of overheating of an anode or other effects, to permit the passage of positive current to the anode thereby creating a virtual short-circuit condition in the rectifier itself. To protect the rectifier against injury or explosion from this cause, circuit breakers are usually provided on both sides of the rectifier, and high speed relays are provided to open both circuit breakers in response to reverse power flow through the rectifier. A relay is usually provided, also, for opening one or both of the circuit breakers in response to over-current in the normal direction.

The rotary converter, in common with other dynamo-electric machinery, is more efficient in the larger sizes, although because of limitations in its peripheral commutator speed, the larger sized machines must be operated at lower speeds than the smaller ones, and the output does not increase disproportionately to the weight in the larger sizes but remains approximately proportional to the weight. The initial cost of a rotary converter is, therefore, approximately proportional to its output and an advantage in efficiency is gained in the larger size units. The initial cost of a mercury-arc rectifier, on the other hand, depends primarily on its current-carrying capacity, and its losses depend substantially upon current irrespective of voltage. A rectifier, therefore, is most efficient from the standpoint of both initial cost and efficiency when operated at high voltages, regardless of its output. The economics of these forms of apparatus, therefore, indicate the use of relatively few rotary converter units of large power capacity, and the use of rectifiers at high voltages regardless of size. However, because of the relatively high initial cost of the protective equipment ordinarily used with rectifiers, the rectifier also is usually more economical in units of comparatively large size.

Considering the load densities of an area to be supplied with direct-current, it will be apparent that the amount of copper necessary to distribute the load of a given large size unit, whether a rotary converter or a rectifier, increases rapidly as the load density diminishes. For low distribution voltages, of the order of 250 volts, the mercury-arc rectifier, because of the comparatively high initial cost of the rectifier itself and its protective equipment, has not been heretofore considered economically practical. On the other hand, because of the relatively large amount of distribution copper required in connection with large size rotary converters, the latter form of apparatus has proved to be economically practical at direct-current voltages of the order of 250 volts only in areas of very high load densities, usually the central parts of large cities.

Because of these limitations of both converter equipment and rectifier equipment as heretofore used, many operating companies have found it impossible to supply direct-current service at voltages of the order of 250 volts in areas of comparatively low load density and have been forced to lose desirable customers for this reason.

I have found that by co-ordinating various properties of the rectifier with the operation of the circuit breakers and network switches commonly used in connection with alternating-current feeders, the elaborate protective equipment heretofore used in connection with rectifiers may be greatly simplified. Because of the reduction of initial cost effected in this manner, rectifier units of smaller size may be used, thereby reducing the amount of distribution copper necessary, and a combined alternating-current and direct-current distributor system may be produced which will operate to economically supply direct-current at voltages of the order of 250 volts in areas of any load density.

It is accordingly an object of my invention to provide a novel and simple distribution system in which direct current output voltages of the order of 250 volts shall be obtained by means of rectifiers and in which adequate protection against faults shall be provided.

According to my invention, I use a single high-speed reverse-current operated circuit breaker on the direct-current side of each rectifier to open the cathode arc circuit in case of a back-fire, and baffles or grids within the rectifier itself to interrupt arcs between anodes. I use the unidirectional conducting property of the rectifier itself to prevent reverse power flow from the direct-current network to a feeder in case of a feeder fault. In this way the circuit breaker usually provided on the alternating current side of the rectifier, together with the control relays associated with the rectifier unit are eliminated and adequate protection is obtained. Secondary faults on either the alternating-current or direct-current networks are burned clear. For burning direct-current network faults clear, the high overload capacity of the rectifiers, which may be as high as 300% rated capacity for momentary overloads, or 150% for sustained overloads of 20 minute duration, is available.

Other objects of my invention will become evident from the following detailed description taken in conjunction with the accompanying drawings, in which Figure 1 is a diagrammatic view of a distribution system embodying my invention.

Figure 1:
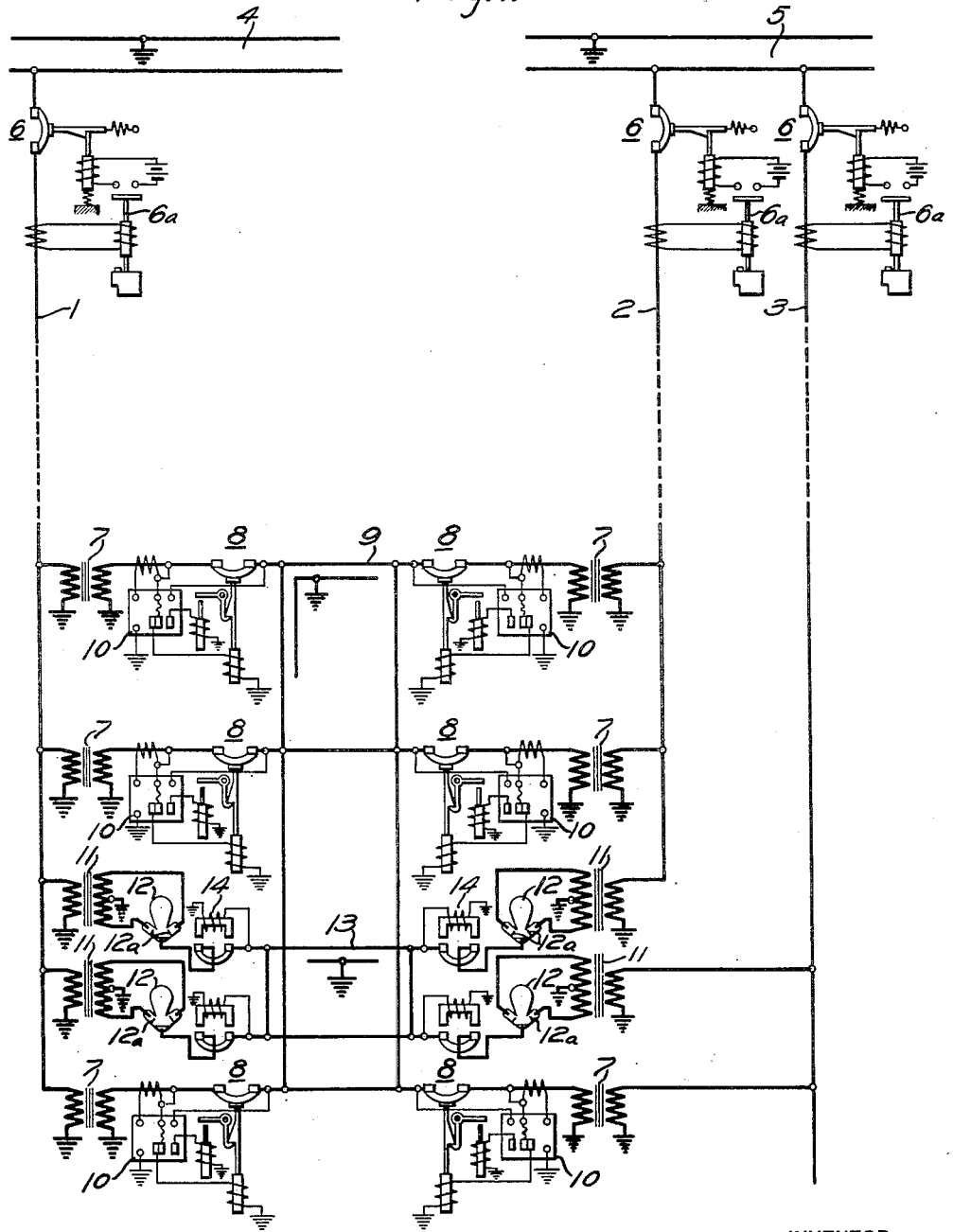

Referring to Fig. 1 of the drawings, a plurality of feeders 1, 2 and 3 are connected to high-voltage alternating-current supply circuits 4 and 5 by means of circuit breakers 6. Each of the circuit breakers 6 is provided with a fault responsive device 6a, which I have illustrated as a time-element over-current relay, for tripping open the circuit breaker in response to an abnormal circuit condition of the associated feeder. The feeders 1, 2 and 3 are connected by means of banks of transformers indicated diagrammatically at 7 and network switches 8 to an alternating-current distribution network 9. A power directional relay 10 is provided for opening each of the network switches 8 in response to power flow above a predetermined minimum from the network 9 to the corresponding transformer bank 7, and for automatically reclosing the corresponding network switch 8 in response to a predetermined normal relationship of feeder and network voltages in a well-known manner.

The feeders 1, 2 and 3 are also connected through rectifier transformers 11 and rectifiers 12 to a direct-current distribution network 13. The rectifier transformers 11 have tansformation ratios, determined by the voltages of the supply circuits 4 and 5, such that the voltage maintained on the direct current network 13 is of the order of 250 volts. The rectifiers 12 are provided with anode grids 12a or equivalent devices for interrupting arcs between anodes in the event of a back-fire. High-speed direct current circuit breakers 14 are interposed between each of the rectifiers and the network 13 for disconnecting each of the rectifiers from the network 13 in response to reverse current if a fault occurs in the rectifier.

Figure 2:
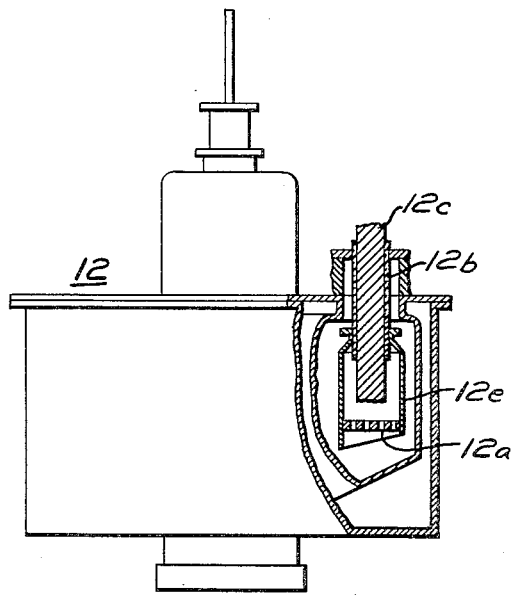
Fig. 2 is a diagrammatic view of a rectifier tank with parts broken away.

Referring to Fig. 2, which is a diagrammatic view of a mercury-arc rectifier tank with parts broken away to show the construction of an anode, the anode grid 12a used in the practice of my invention is secured within the anode shield 12e and the assembly thus formed is mounted upon an insulating sleeve 12b. The insulating sleeve 12b surrounds and supports the anode proper 12c and insulates it from the metal rectifier tank. The grid 12a may be entirely insulated, as shown or it may be connected with external circuits for controlling its potential in a well known manner. It will be understood that Fig. 2 is diagrammatic only and that various elements of the rectifier unit such as other electrodes, starting apparatus, fuses, cooling apparatus, vacuum pumps, electrical filters for removing output harmonics, etc., which would be used in practice have, for simplicity, been omitted.

Figure 3:
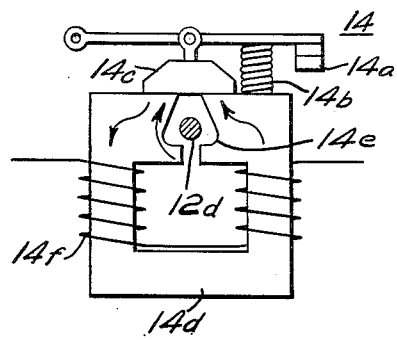
Fig. 3 is a diagrammatic view of a direct-current circuit breaker which may be used in the practice of my invention.

Referring to Fig. 3, the principal operating elements of a high speed circuit breaker 14, such as may be used in the practice of my invention, are shown diagrammatically therein. The contact members 14a of the circuit breaker are biased to open position by means of a compression spring 14b and may be held in closed position electromagnetically by means of an armature member 14c controlled by a core member 14d, both of magnetic material. The core member 14d is cut away at 14e to permit a cathode conductor 12d leading from the rectifier 12 to pass therethrough. A biasing winding 14f is mounted on the core member 14d, and as shown in Fig. 1, is connected to the network 13 for direct current excitation. The biasing winding 14f is wound in such direction that the part of its flux flowing in the armature 14c adds to the cylindrical flux produced by the conductor 12d when the direction of current flow in the latter is normal, i. e., a negative current flowing from the network 13 to the cathode of the rectifier 12. If the direction of current flow in the conductor 12d reverses, the flux produced by the reverse current bucks the flux produced by the biasing winding 14f to reduce the magnetic force acting on the armature member 14c and thereby permit the spring 14b to open the contact members 14a.

Assuming that the supply circuits 4 and 5 are energized, the operation of the apparatus shown in Fig. 1 may be set forth as follows: If a fault occurs on the direct current network 13, the full momentary overload capacity of all the rectifiers 12 is available to burn the fault clear. As this momentary overload capacity may be as high as 300% of the total capacity of all the rectifiers 12, and as the voltage of the network 13 is only 250 volts, sufficient current is available to burn practically any secondary fault clear. The time element of the over-current relay 6a, prevents the opening of the circuit breakers 6 while a secondary fault is being burned clear. However, in the event of a sustained secondary short circuit, the circuit breakers 6 trip open in time to prevent the destruction of apparatus.

Upon the occurrence of a fault on one of the feeders, feeder 1 for example, power is fed to the fault from the supply circuit 4, and also in reverse direction from the alternating-current network 9. The power directional relays 10 associated with feeder 1 now operate to trip open the corresponding (left) network switches 8. The rectifiers 12 operate to prevent the flow of power from the direct-current network 13 to the feeder 1, and the circuit breaker 6 associated with the feeder 1, at the expiration of the time element of its over-current relay 6a, is tripped open to thereby disconnect the feeder 1 entirely. Power is now supplied to the networks 9 and 13 by means of the feeders 2 and 3 and transformers connected therewith.

When the fault on feeder 1 has been cleared and the feeder voltage is restored, the power-directional relays 10 associated with the feeder 1, operate in response to a predetermined relationship of network and feeder voltages, to reclose the corresponding network switches 8, in a well known manner.

If a back-fire occurs in one of the rectifiers 12, the direct current circuit breaker 14 associated with the faulted rectifier immediately opens to interrupt the direct current arc between the rectifier cathode and the faulty anode. The time required for operation of a circuit breaker of the type described is of the order of .007 seconds. If alternating-current arcs have started between the faulty anode and other anodes, these continue for a half cycle until the voltage between anodes reverses. At this point the arc is extinguished and the anode shields 12e and grids 12a act in a well-known manner to prevent re-starting of the arc.

Although for simplicity, I have illustrated my invention as applied to single-phase apparatus and circuits, it will be understood that the invention is equally applicable to polyphase apparatus and circuits.

I do not intend that the present invention shall be restricted to the specific structural details, arrangements of parts or circuit connections herein set forth as various modifications thereof may be effected without departing from the spirit and scope of my invention. I desire, therefore, that only such limitations shall be imposed as are indicated in the appended claims.

I claim as my invention:

1. In a protective system, an alternating-current supply circuit, an alternating-current distribution circuit, a direct-current distribution circuit, a feeder for transmitting power from said supply circuit to said distribution circuits, additional means for supplying power to said alternating-current distribution circuit, additional means for supplying power to said direct-current distribution circuit, a circuit breaker in said feeder and located between said supply circuit and both of said distribution circuits, means responsive to an abnormal circuit condition of said feeder for opening said breaker, a network switch for controlling the flow of power between said feeder and said alternating-current distribution circuit, means responsive to power flow from said alternating-current distribution circuit to said feeder for opening said switch and a rectifier for transmitting power from said feeder to said direct-current circuit and for cooperating with said breaker and said switch to deenergize said feeder in response to a fault thereon.

2. In a protective system, an alternating-current supply circuit, an alternating-current distribution circuit, a direct-current distribution circuit, a feeder for transmitting power from said supply circuit to said distribution circuits, additional means for supplying power to said alternating-current distribution circuit, additional means for supplying power to said direct-current distribution circuit, a circuit breaker in said feeder and located between said supply circuit and both of said distribution circuits, a time element device responsive to over-current in said feeder for opening said breaker, a network switch for controlling the flow of power between said feeder and said alternating-current distribution circuit, means responsive to power flow from said alternating-current distribution circuit to said feeder for opening said switch and a rectifier having relatively high momentary overload capacity for transmitting power from said feeder to said direct-current circuit, for cooperating with said time-element device to burn faults on said direct-current circuit clear and for cooperating with said breaker and said switch to deenergize said feeder in response to a fault thereon.

3. In a protective system, an alternating-current supply circuit, an alternating-current distribution circuit, a direct-current distribution circuit, a feeder for transmitting power from said supply circuit to said distribution circuits, additional means for supplying power to said alternating-current distribution circuit, additional means for supplying power to said direct-current distribution circuit, a circuit breaker in said feeder and located between said supply circuit and both of said distribution circuits, a time-element device responsive to over-current in said feeder for opening said breaker, a network switch for controlling the flow of power between said feeder and said alternating-current distribution circuit, means responsive to power flow from said alternating-current distribution circuit to said feeder for opening said switch and a rectifier having relatively high momentary overload capacity at voltages of the order of 250 volts direct, for transmitting power from said feeder to said direct-current circuit at substantially 250 volts direct, for cooperating with said time-element device to burn faults on said direct-current circuit clear and for cooperating with said breaker and said switch to deenergize said feeder in response to a fault thereon.

4. In a protective system, an alternating-current supply circuit, an alternating current distribution circuit, a direct-current distribution circuit, a feeder for transmitting power from said supply circuit to said distribution circuits, additional means for supplying power to said alternating-current distribution circuit, additional means for supplying power to said direct-current distribution circuit, a circuit breaker in said feeder and located between said supply circuit and both of said distribution circuits, means responsive to an abnormal circuit condition of said feeder for opening said breaker, a network switch for controlling the flow of power between said feeder and said alternating-current distribution circuit, means responsive to power flow from said alternating-current distribution circuit to said feeder for opening said switch, a rectifier for transmitting power from said feeder to said direct-current circuit and for cooperating with said breaker and said switch to deenergize said feeder in response to a fault thereon, and a circuit breaker for disconnecting said rectifier from said direct-current circuit upon the occurrence of a fault in said rectifier.

5. In a protective system, an alternating-current supply circuit, an alternating current distribution circuit, a direct-current distribution circuit, a feeder for transmitting power from said supply circuit to said distribution circuits, additional means for supplying power to said alternating-current distribution circuit, additional means for supplying power to said direct-current distribution circuit, a circuit breaker in said feeder and located between said supply circuit and both of said distribution circuits, means responsive to an abnormal circuit condition of said feeder for opening said breaker, a network switch for controlling the flow of power between said feeder and said alternating-current distribution circuit, means responsive to power flow from said alternating-current distribution circuit to said feeder for opening said switch, a mercury-arc rectifier for transmitting power from said feeder to said direct-current circuit and for cooperating with said breaker and said switch to deenergize said feeder in response to a fault thereon, said rectifier having electrostatic anode grids for interrupting alternating-current arcs between anodes, and a circuit breaker operable in response to reverse current flow from said direct-current circuit to said rectifier for interrupting the cathode circuit of said rectifier upon the occurrence of a fault in said rectifier.

JOHN S. PARSONS.